Aug. 8, 1967     C. S. GRAVES, JR     3,334,755
HOISTING DEVICE ASSEMBLY
Filed Sept. 24, 1965     2 Sheets-Sheet 1
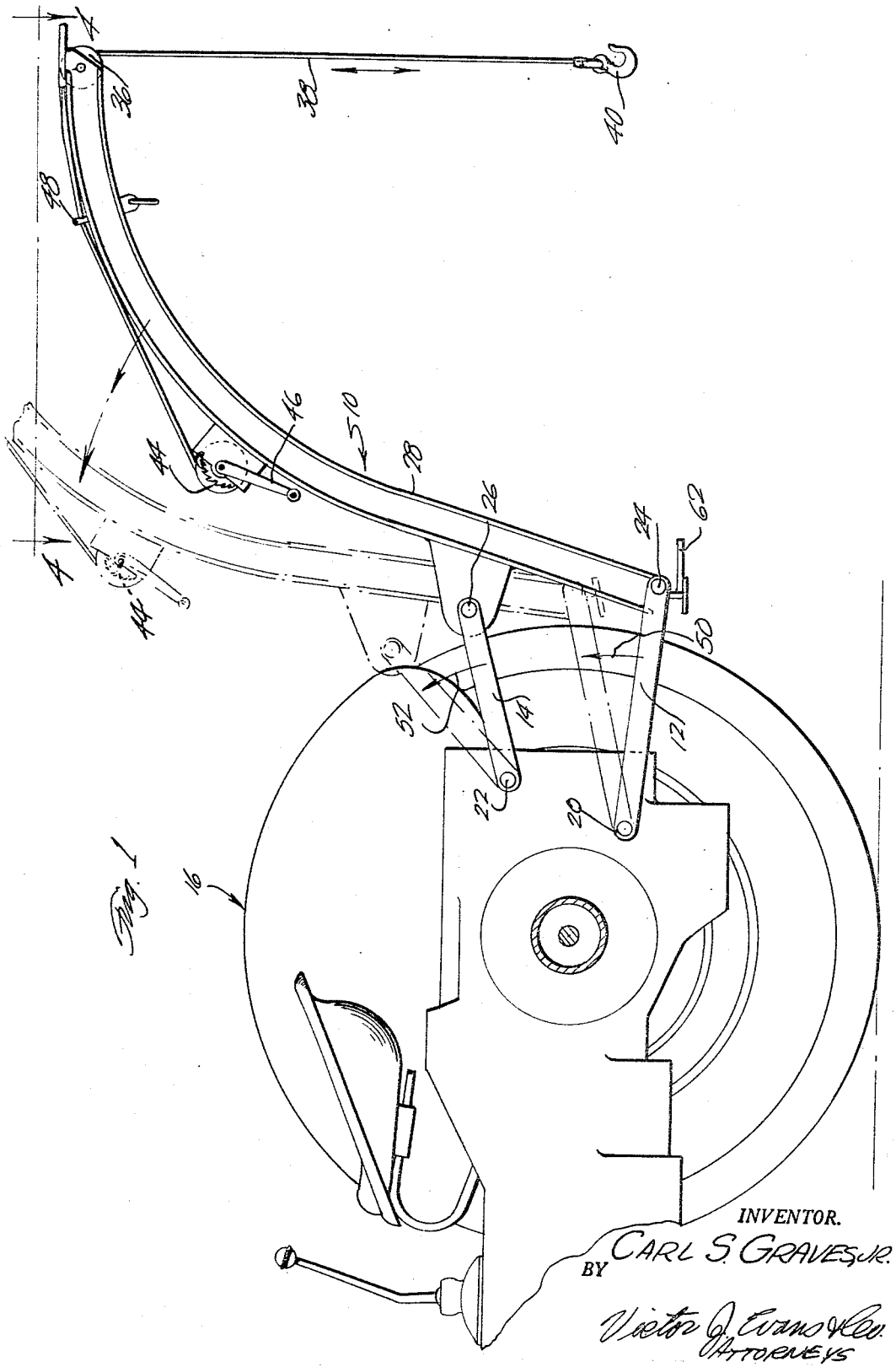
INVENTOR.
CARL S. GRAVES JR.
BY
Victor J. Evans & Co.
ATTORNEYS

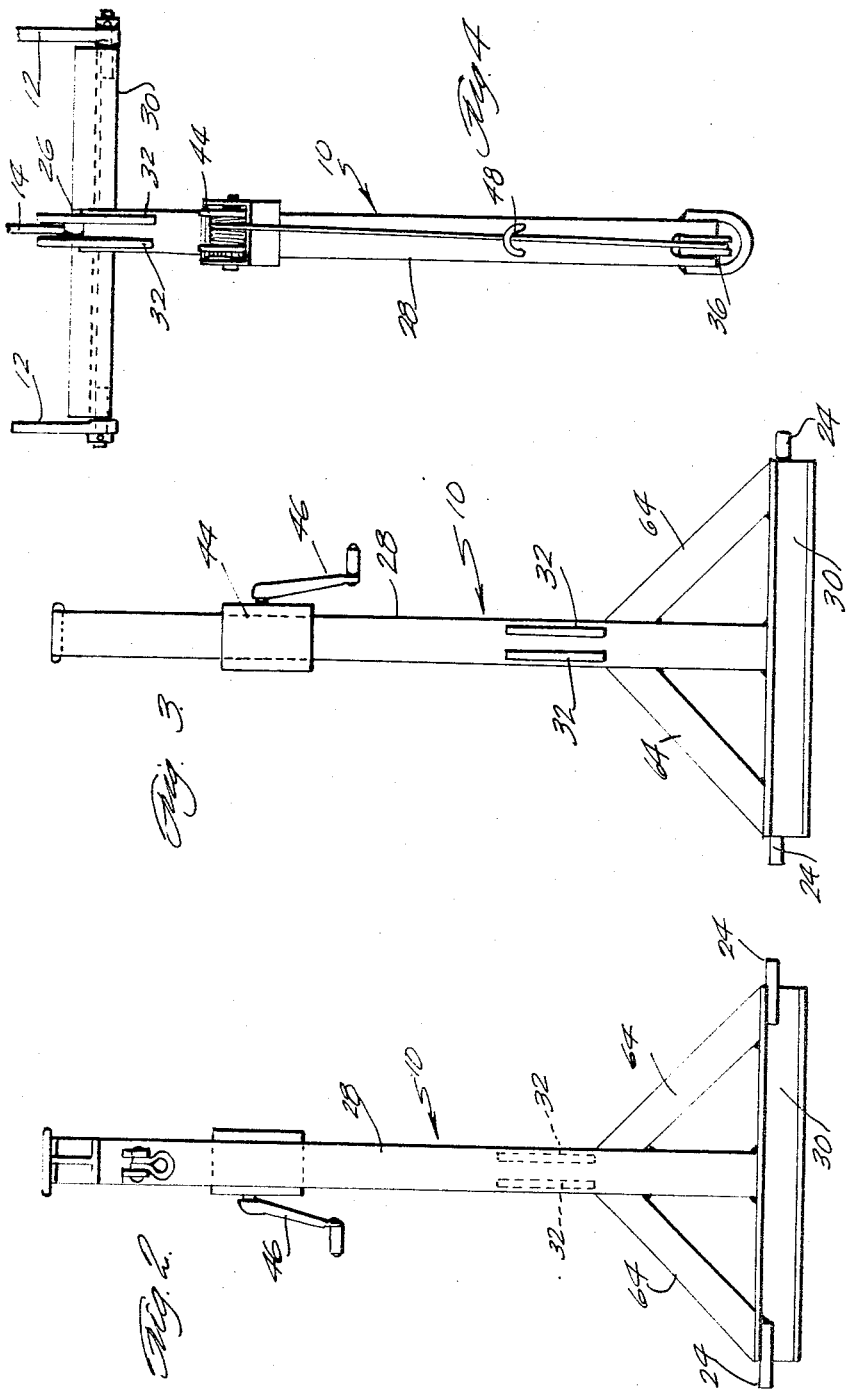

United States Patent Office 3,334,755
Patented Aug. 8, 1967

3,334,755
HOISTING DEVICE ASSEMBLY
Carl S. Graves, Jr., Box 217, San Simon, Ariz. 85632
Filed Sept. 24, 1965, Ser. No. 490,019
1 Claim. (Cl. 212—8)

ABSTRACT OF THE DISCLOSURE

A hoisting device attachment for a tractor having a simple linkage to a tractor and being supported from an intermediate portion of a cantilever support including a crank arm, pawl and ratchet mechanism mounted from such intermediate portion of the cantilever support for drawing a hook and line over a pulley thereof, a second link having an end pivotally mounted proximate to the first link thereof in which the ends of the links are each coupled to the cantilever support adapted to be raised and lowered by an hydraulic mechanism for hoisting a load on the hook as suspended by said line, one of the links comprising providing triangular support of the cantilever support, and a step platform disposed along the pivotal end of the cantilever support and proximate to the said pair of links.

---

The present invention relates to a hoisting device assembly for attachment to a tractor or the like, and more particularly relates to an adjustable hoisting or cantilever support arrangement adapted to be attached or connected to a tractor and the like, and being operable or actuated by a hydraulic drive mechanism for raising and lowering the cantiliver support, said cantilever support being coupled by a series of links which are interposed between the crank arm and the tractor mounting means.

A paramount object of the present invention is to provide a new and improved adjustably disposed hoisting assembly that is based on an inter-coupled link assembly that is pivotally mounted from the tractor and from the hoisting device, so that as the link mechanisms are displaced, added lifting power and added versatility to the hoisting device are provided for the general operation thereof.

A further advantage of the present invention is that the installed hydraulic system of the tractor, or other vehicle means, may be used for actuating and operating the hoist device without providing any additional prime mover means.

A further advantage and object of the present invention is to provide mounting for a base portion of a tractor draw bar hoist having a plate for connecting an implement thereto, and also associating the three point draw bar with the pivotal mounts of the base portion of the winch and to connect the free end of the draw bar with the winch.

The above and other objects and advantages of the invention will become apparent upon full consideration of the following detailed description and accompanying drawings in which:

FIGURE 1 is a side elevational view of a tractor showing the hoisting device in a first and second position, and being mounted thereon in the manner according to a preferred embodiment of the invention;

FIGURE 2 shows a rear view of the hoisting device, per se, when disposed in the lowered position;

FIGURE 3 shows a front elevational view of the hoisting device of that shown in FIGURE 2; and FIGURE 4 shows a plan elevational view of the hoisting device taken along lines 4—4 of FIGURE 1.

Referring now to the drawings, there is shown a hoisting device 10 which is held by a series of link mechanisms 12, 14, to a pivotal mounting on a truck or tractor 16, or the like. The link mechanisms 12, 14 are respectively held by the tractor 16 by pins or pivot means 20, 22, and the pivot means 24, 26 are used to secure the link mechanisms 12, 14 onto the hoisting device.

As more distinctly shown in FIGURES 2, 3 and 4, the hoisting mechanism 10 comprises a cantilever support 28 having a triangular configured base or mounting structure 30 which includes a transverse member on which the pins 24, 24 are used to be secured onto the link mechanisms 12, 12, as particularly illustrated in FIGURE 4.

The upper link mechanism 14 is secured to a pair of plates 32, 32 by the pin 26, as shown in FIGURE 4.

The cantilever support is arcuately contoured for resembling a crane or known hoisting mechanism in part, and at the free end thereof there is a pulley or wheel 36 on which a line 38 overrides for supporting a hook 40 at the free end of the line. and the other end of the line 38 being adapted to be wound and unwound from a ratchet and pawl mechanism 44. The ratchet and pawl mechanism is adapted to contain a crank arm 46, as shown in FIGURES 1, 2 and 3. The pawl maintains the line in a fixed position when a load is disposed to hang from the hook 40. A guide means 48 may be provided for assuring alignment of the line 38 between the pulley and the ratchet and pawl mechanism 44.

In accordance with the best mode of operation in the use of the invention, the tractor is driven proximate to the load desired to be lifted and the hook is applied to the load (not shown) in a well-known manner. The line 38 is drawn taut, or the crank arm 46 is turned in a counterclockwise direction with respect to the showing in FIGURE 1, so that the line 38 is under a slight degree of tension, and the link mechanisms 12, 14 are lifted upwardly as shown by arrows 50, 52 in FIGURE 1, by a hydraulic pushrod, or other hydraulic means (not shown) that are conventionally provided on such tractors 16. In this way, without using any undue forces for manually turning the crank arm 46 in a continued counterclockwise direction, the hydraulic prime mover of the tractor 16 may be applied for lifting the cantilever support so that it is raised into the position shown in dotted line in FIGURE 1. Thus the load on hook 40 is raised above ground to suspend the load from the pulley 36, and the tractor may be driven around as desired until the load is sought to be released.

As is seen in the drawing, the mounting for the base portion of the pulley or wheel 36 and the winch including the mechanism 44, 46, includes the link mechanisms 12, 12, 14, 14, and a plate 62 for connecting an implement (not shown) thereto, and it is seen that the base portion of the winch is provided with a three point draw bar with the pivotal mounts, including the cantilever support 28 and the side supports 64, 64, therefore, the pivotal mounts for the base portion of the winch therefore being provided to connect the free end of the draw bar with the winch by means of the link mechanisms 12, 12, 14, 14.

When the load on hook 40 is ready to be lowered, the hydraulic means (not shown) of tractor 16 allows the link mechanism 12, 14 to be displaced in a direction reversed to that shown by arrows 50, 52 in FIGURE 1, so that the hoist mechanism 10 returns to its initial position. In this way, the load is returned to a resting place (not shown) and hook 40 is then released therefrom.

Additional embodiments of the invention in this specification will occur to others and therefore it is intended that the scope of the invention be limited only by the appended claims and not by the embodiment described hereinabove. Accordingly, reference should be made to the following claim in determining the full scope of the invention.

What is claimed is:

A hoisting device for attachment to a tractor or the like, comprising a cantilever support being pivotally mounted from a pair of links at one end thereof and having a pulley at the other end, a crank arm, pawl and ratchet mechanism mounted from an intermediate portion of said cantilever support for drawing a hook and line over said pulley, said line being held in place by said pawl and ratchet mechanism, a link mechanism having an end pivotally mounted to said support above and proximate to said pair of links, each of the other ends of said links and link mechanism being disposed for mounting on a tractor or similar vehicle, the ends of the links and link mechanism each being coupled to the cantilever support adapted to being raised and lowered by an hydraulic mechanism for hoisting a load on the hook as suspended by said line, said pair of links and the link mechanism providing triangular support of said cantilever support from said tractor, and a step platform being disposed along the pivotal end of said cantilever support and proximate to said pair of links.

References Cited

UNITED STATES PATENTS

| | | | |
|---|---|---|---|
| 1,660,413 | 2/1928 | Burger et al. | 254—139.1 |
| 2,398,585 | 4/1946 | Hayward | 212—8 |
| 2,505,639 | 4/1950 | Eaton | 212—8 |

ANDRES H. NIELSEN, *Primary Examiner.*